United States Patent
Seemann

(10) Patent No.: US 7,661,076 B2
(45) Date of Patent: Feb. 9, 2010

(54) TWO DIMENSIONAL TREES TO EDIT GRAPH-LIKE DIAGRAMS

(75) Inventor: Jochen Seemann, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 11/395,624

(22) Filed: Mar. 31, 2006

(65) Prior Publication Data

US 2007/0234237 A1     Oct. 4, 2007

(51) Int. Cl.
G06F 3/00 (2006.01)
G06F 3/14 (2006.01)

(52) U.S. Cl. .................. 715/854; 715/853; 715/765; 715/835

(58) Field of Classification Search ............ 715/764, 715/765, 853, 854
See application file for complete search history.

(56) References Cited

U.S. PATENT DOCUMENTS

| | | | |
|---|---|---|---|
| 5,907,704 A * | 5/1999 | Gudmundson et al. ...... 717/100 |
| 6,532,471 B1 | 3/2003 | Ku et al. |
| 6,636,250 B1 * | 10/2003 | Gasser ...................... 715/853 |
| 6,907,417 B2 | 6/2005 | Alpert |
| 6,931,625 B1 | 8/2005 | Coad et al. |
| 6,952,208 B1 | 10/2005 | Arquie et al. |
| 2003/0218641 A1 * | 11/2003 | Longobardi ................ 345/853 |
| 2004/0205726 A1 | 10/2004 | Chedgey et al. |
| 2004/0239683 A1 * | 12/2004 | Chu et al. ................... 345/619 |
| 2006/0037019 A1 * | 2/2006 | Austin et al. ................ 718/100 |
| 2006/0150169 A1 | 7/2006 | Cook et al. ................. 717/108 |

OTHER PUBLICATIONS

Seeman, Jochen, "Extending the Sugiyama Algorithm for Drawings UML Class Diagrams: Towards Automatic Layout of Object-Oriented Software Diagrams", Lecture Notes in Computer Science, vol. 1353, Proceedings of the 5th International Symposium on Graph Drawing table of Contents. 1997.

* cited by examiner

Primary Examiner—X. L Bautista
(74) Attorney, Agent, or Firm—Workman Nydegger

(57) ABSTRACT

Dynamically laying out a graphical diagram based on a graph-like visual language into a two dimensional tree-like structure to allow ease of user interaction with and optimal display. A graphical tree-like structure is displayed that includes at least one branch that starts at the root of the tree-like structure and includes one or more sub-portions that are configured to be modified in a vertical direction and a horizontal direction. The sub-portions represent an overall object model in terms of functional relationships and internal behaviors for one or more objects, attributes, operations, and associations. User input is received that modifies one or more of the sub-portions other than the end portion. Based on the user input, one or more sub-portions are modified horizontally, vertically, or both to allow for ease of user interaction, optimization of the display of the graphical tree-like structure or both.

16 Claims, 6 Drawing Sheets

TWO DIMENSIONAL TREES TO EDIT GRAPH-LIKE DIAGRAMS

CROSS-REFERENCE TO RELATED APPLICATIONS

Not applicable

BACKGROUND

Computing systems have revolutionized the way we work and play. Computing systems come in a wide variety of forms including laptop computers, desktop computers, personal digital assistants, telephones, and even devices that have not been conventionally associated with computing systems such as, for example, refrigerators and automobiles. Computing systems may even comprise a number of constituent computing systems interconnected via a network. Thus, some computing systems may be small enough to fit in the palm of the hand, while others are spread over much of the globe.

One area of computing technology that has become increasingly popular is graphical modeling, which allows a user to visually display graph-like diagrams such as flow diagrams of numerous systems, services, or processes. Examples of diagrams include work flow diagrams, data flow diagrams, E-R diagrams, business process diagrams, and the like. More specifically, such graph-like diagrams allow users to visually communicate the functionality, behavioral aspects, and relationships of the various components or elements for different computing or other systems, business or project models, or the like; thus allowing for the efficient communication of often complex systems or processes.

For example, a graph-like diagram may visualize the flow of a sales transaction. The elements and components of the flow diagram may represent such events as selecting desired products, placing an order, arranging delivery and payment. The diagram may also visualize the entities that perform the tasks listed above. For very complex sales transaction with numerous entities involved, viewing the transaction graphically may be easier to comprehend than in other forms.

While graph-like diagrams are useful in visualizing systems and processes, there are limitations on their usefulness. For example, as the diagrams get larger and more complex, there may simply not be enough room to display all of the components and elements due to the size, resolution, and other capabilities of the display device. In other words, the available display space and capabilities limit how many components and objects can be viewed at one time. This is especially problematic for diagrams where a user desires to display both the beginning and end of a process.

One solution would be to use a larger display device. However, this is impractical for most users because of the cost this would entail. In addition, the diagrams may become so large that no practical display device could display all of the elements of the diagram.

Another solution to the display limitation commonly used is having the user manually rescale the diagram. For example, users will often "zoom out" anytime a new element is added to a diagram. While this solution may be effective for a diagram with only a few elements, it does not work well for larger diagrams. The diagrams often become unreadable after being zoomed out several times.

Another common solution is making multiple diagrams that together contain all of the required diagram elements in a readable size. However, this often can be time consuming. In addition, the flow or "mental map" of the diagram is often lost using multiple diagrams, which can be frustrating to a user.

A further solution has been to create tools that automatically layout the elements of the diagrams in an attempt to scale the diagrams in a readable form. However, such tools implement complex algorithms whose computational complexities make them very slow to process. Anytime a new element is added to the diagram, the tools must reprocess the algorithms and create a new diagram, making such tools impractical for an interactive editor. Further, most of these algorithms reposition every element of the diagram when a new element is added. As a result, the user often looses his or her "mental map" of the diagram, which can be annoying.

BRIEF SUMMARY

The above-identified deficiencies and drawback of current diagram generation and display methods are overcome through example embodiments disclosed herein. Note that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example embodiment provides for dynamically laying out a graphical diagram based on a graph-like visual language into a two dimensional tree-like structure to allow ease of user interaction with and optimal display. In this embodiment, a graphical tree-like structure is displayed. The graphical tree-like structure includes at least one branch that starts a root of the graphical tree-like structure and includes one or more sub-portions that are configured to be modified in a vertical direction and a horizontal direction. The sub-portions represent an overall object model in terms of functional relationships and internal behaviors for one or more objects, attributes, operations, and associations. User input is then received that modifies one or more of the sub-portions. Based on the user input, one or more sub-portions are dynamically modified vertically, horizontally, or both for ease of user interaction, optimization of the display of the graphical tree-like structure or both.

Another example embodiment also provides for dynamically laying out a flow diagram based on a graph-like visual language into a two dimensional tree-like v structure to allow ease of user interaction with and optimal display. In this embodiment, a graphical tree-like structure is displayed. The graphical tree-like structure includes at least one branch that starts at a root of the tree-like structure and includes a plurality of sub-portions. At least one of the sub-portions is also an end portion. The sub-portions portions represent an overall object model in terms of functional relationships and internal behaviors for one or more objects, attributes, operations, and associations. User input is then received that modifies one or more of the sub-portions other than the end portion. Based on the user input, one or more sub-portions other than the end portion are scaled, expanded, or collapsed without also modifying the end portion. This modification allows for ease of user interaction, optimization of the display of the graphical tree-like structure or both.

A further example embodiment provides for persistently retaining in memory modifications made to one or more sub-branches of a graphical tree-like structure when the application displaying the graphical tree-like structure is exited. In this embodiment, an application that displays a graphical tree-like structure is activated. The graphical tree-like structure includes at least one branch that starts at a root of the tree-like structure and includes one or more sub-branches that model a system, service, or process in terms of functional relationships and internal behaviors for one or more objects, attributes, operations, and associations. User input is received that modifies at least one sub-branch. Based on this user input, the modification is maintained in persistent memory. Upon reactivation of the application at a later time after a user has exited the application, the graphical tree-like structure is displayed as it appeared before the application was exited.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
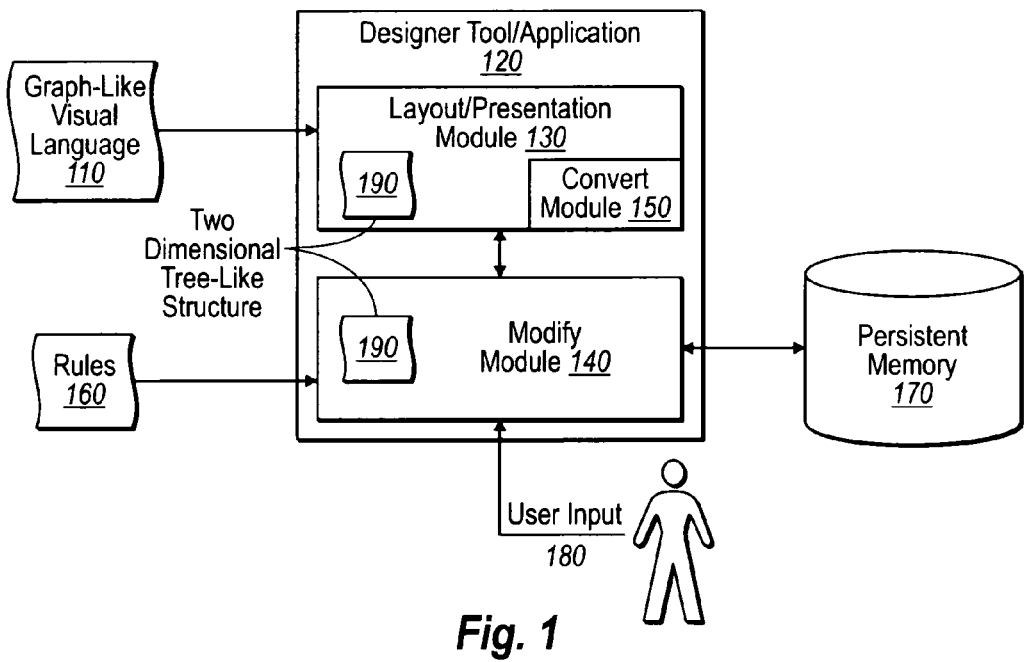
FIG. 1 illustrates a computing system for dynamically displaying a graph-like visual language as a graphical two dimensional tree-like structure.

The present invention extends to methods, systems, and computer program products for dynamically laying out a graph-like visual language into a two dimensional tree-like structure to allow for ease of user interaction and optimal display. The embodiments of the present invention may comprise a special purpose or general-purpose computer including various computer hardware or modules, as discussed in greater detail below.

Example embodiments provide for several mechanisms that are configured to overcome various deficiencies of current tools for laying out graph-like visual languages in a way the allows for dynamic interaction and optimum display. For example, one embodiment herein provides a mechanism for dynamically laying out flow diagrams in a two dimensional tree-like structure. The graph-like visual language is displayed as a two dimensional graphical tree-like structure. The graphical tree-like structure includes at least one branch starting at a root of the tree-like structure and including sub-portions. The sub-portions are used to represent an overall object model in terms of functional relationships and internal behaviors for one or more objects, attributes, operations, or associations of the tree-like structure. The sub-portions may also include at least one end portion, although this is not required for all embodiments.

The tree-like structure is displayed in a manner facilitating user interaction. For example, user interactive (UI) elements may be displayed that control the modification of the sub-portion. User interaction, such as selecting a UI element, is received that modifies one or more sub-portions that are not the end portion. The modifications include scaling, collapsing, and expanding the sub-portions.

Based on the user interaction, the two dimensional tree-like structure is dynamically modified. For example in some embodiments, sub-portions other than the end portion may be scaled to optimize the display of the tree-like structure in the available display space or sub-portions may be collapsed or expanded to allow the viewing desired sections of the tree-like structure regardless of how large the tree-like structure is. In other embodiments, the sub-portions may be modified horizontally, vertically, or both.

Other embodiments allow for the persisting of modifications made to a tree-like structure even when an application running the tree like structure is exited. For example, an application is activated that displays graphical tree-like structures and receives user input that modifies the graphical tree-like structure in the manner of the previous example. However, based on the user input, the modifications to the tree-like structure are maintained in persistent memory. In addition, modifications to one sub-portion that become hidden by subsequent modifications to other sub-portions may also be maintained in the persistent memory. Upon reactivation of the application at a time after the user has exited the application, the graphical tree-like structure is displayed as it appeared before the application was exited. The maintaining of the modifications, both visible and hidden, allow for the graphical tree-like structure to be displayed over time without having to constantly redo modifications when the application is exited and restarted. Further, maintaining the hidden states ensures that no sub-portions are lost when the application is exited.

Further embodiments allow for the conversion of graph-like visual languages and tree-like structures that cannot be modified into two dimensional tree-like structures that can be dynamically modified. These embodiments also allow for the conversion of one dimensional tree-like structures that include one branch starting at the root of the tree-like structure and including a plurality of sub-portions that model systems, services, and processes and include an end portion. The sub-portions of the one dimensional tree-like structure cannot be modified without also modifying the end portion, which is in contrast to a two-dimensional tree-like structure whose sub-portions can be modified without also modifying the end portion. Converting these structures to the two dimensional tree-like structure allows a user the ability to utilize the dynamic modification and display optimization of the two dimensional tree-like structures. In addition, this allows the for the automatic optimizing to the aspect ratio of the available display screen or window by automatically switching the orientation of the sub-portions between vertical and horizontal as needed.

Although more specific reference to advantageous features are described in greater detail below with regards to the Figures, embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

Referring now to the drawings, FIG. 1 illustrates a computing system that may be used to implement the various embodiments disclosed herein. Computing system 100 depicts various modules and components that can be used when implementing the embodiments. Note that computing system 100 is illustrated by way of example only and should not be used to limit the scope of the appended claims or any of the embodiments disclosed herein. In other words, there are numerous other computing systems and component configurations that may be used to implement embodiments described herein.

Computing system 100 includes a graph-like visual language 110, which may be used to model flow diagrams of systems, services, and processes. Common examples of graph-like visual languages include structure diagrams that emphasize what things typically are in the system, service, or process being modeled, behavior diagrams that emphasize what generally happens in the system, service, or process being modeled, and interaction diagrams that emphasize the flow of control and data among the things in the system, service, or process being modeled. Other common graph-like visual languages include the various diagram types of the Unified Modeling Language (UML), entity relationship diagrams in the database world, and business process diagrams for business process design. In general, embodiments described herein apply to a graph-like visual language 110 that may be any general purpose graph-like visual language. Accordingly, any reference in this description to a specific graph-like visual language is for illustration only and should not be used to limit the scope of the embodiments disclosed herein.

Computing system 100 also includes a design tool/application 120 that facilitates the display of graph-like visual language 110 as a two dimensional tree-like structure 190. Design tool/application 120 also facilitates the dynamic modification of the displayed two dimensional tree-like structure 190. Design tool/application 120 and any of its various modules and/or components may be implemented as software, hardware, or any combination of the two and may be hosted on a single local or remote computing device or in a distributed computing environment.

Design tool 120 includes a layout/presentation module 130 that displays the graph-like visual language 110 as a two dimensional tree-like structure 190. In some embodiments, layout/presentation module 130 displays elements that are entered into designer tool/application 120 by a user. The designer tool/application 120 then automatically draws interconnecting lines between the elements according to the relationships defined by the graph-like visual language 110 being implemented.

In other embodiments, layout module 130 receives or otherwise accesses a graph-like visual language 110 that exists prior to the time it is received. The existing graph-like visual language 110 may be received from the computer(s) hosting design tool 120 or from some other computer connected to computing system 100 over any type of network. In such embodiments, graph-like visual language 110 may be received as a tree-like structure that has sub-portions that cannot be modified or it may received as a one dimensional tree-like structure with sub-portions that can only be modified one-dimensionally as will described in more detail to follow. The existing graph-like visual language may then be provided to a conversion module 150 for conversion to a two dimensional tree-like structure as will also be explained in more detail to follow.

Regardless of whether graph-like language 110 was pre-existing or created by a user, layout/presentation module 130 automatically displays the graph-like language as two dimensional tree-like structure 190. Tree-like structure 190 may include at least one branch starting at a root of the tree-like structure and include a plurality of sub-portions or sub-branches. One of the sub-portions may also be an end portion. The sub-portions model the system, service, or process displayed by graph-like language 110 in terms of functional relationships and internal behaviors for objects, attributes, operations, and associations of the system, service, or process being modeled.

In addition, the two dimensional tree-like structure 190 is constructed or converted by layout/presentation module 130 in such a manner that allows for the sub-portions of the tree-like structure to be dynamically and automatically modified vertically, horizontally, diagonally or all three by designer tool/application 120. In some embodiments, a sub-portion that is also an end portion is excluded from being modified. Specific examples of a two dimensional tree-like structure 190 will be given below.

Designer tool/application 120 further includes a modify module 140. Modify module 140 receives user input 180 from a user that modifies sub-portions of the tree-like structure 190. For example, the user input may select modifiable sub-portion(s) for collapsing, expanding, or scaling. In response to the user input, modify module 140 dynamically and automatically modifies one or more of the sub-portions of the tree-like structure that is being displayed by layout module 130.

For example, the sub-portion(s) may be scaled to optimize available display space, or may be collapsed or expanded to allow for the focused display of selected sub-portions of tree-like structure 190. Advantageously, the configuration of tree-like structure 190 allows for modifications of a given sub-portion without having to also modify any or all sub-portions that branch off the given sub-portion, thus allowing a user to dynamically display desired sub-portions on-the-fly. The sub-portions may be modified horizontally, vertically, diagonally (which may be considered a combination of vertical or horizontal), or any combination of the three.

In addition, the modified sub-portions are dynamically positioned so that the displayed sub-portions optimize the available display space, which advantageously allows the flow diagram to maintain an optimal look. In some circumstances, sub-portions that were displayed horizontally may be repositioned vertically or diagonally to balance the display. Changes to sub-portions displayed vertically and diagonally may also be changed. The above advantages will become more apparent in the discussion of the specific examples of two dimensional tree-like structures to follow.

In some embodiments, modify module 140 also receives predefined rules 160 that specify how the tree-like structure 190 is to be modified and/or displayed. In such embodiments, modify module 160 dynamically scales, expands, or collapses sub-portions other than the at least one end portion based on the user interaction already discussed and the received rules 160. One example rule 160 may direct layout module 130 to place a second graphical element to the right of a first graphical element in the flow diagram and to place all additional objects below the second object.

In further embodiments, designer tool/application 120 may have access to a persistent memory 170. Persistent memory 170 may be any type of reasonable-persistent memory and may be resident on a computer hosting designer tool/application 120 or may be accessed over any type of network connection. In such embodiments, persistent memory 170 is used to maintain any modifications made to the sub-portions of tree-like structure 190 when designer tool/application 120 is exited by a user. When the user reactivates designer tool/application 120, tree-like structure 190 is displayed as it appeared before designer tool/application 120 was exited, as will be explained in more detail to follow.

Figure 2A:
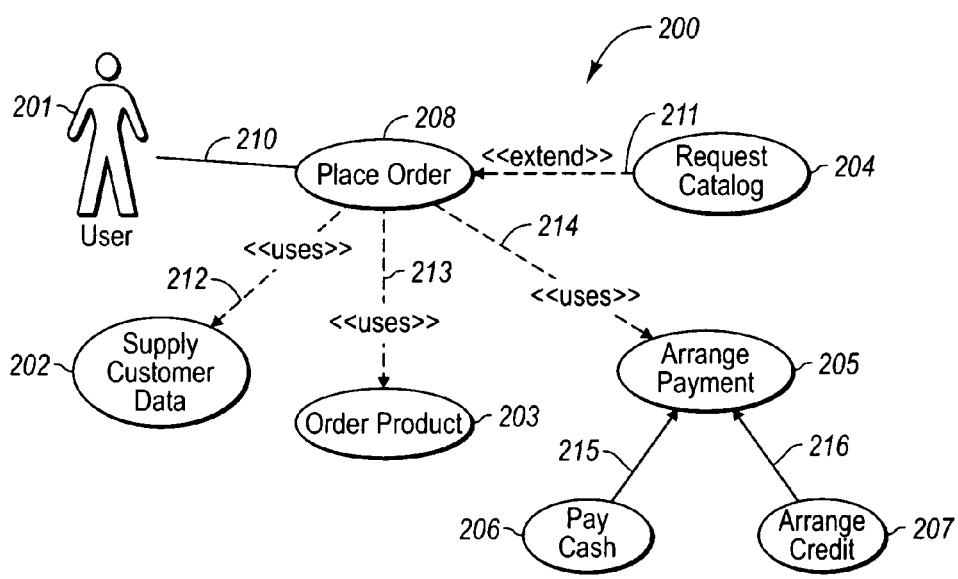
FIG. 2A illustrates an example of a graph-like visual language.

Referring to FIG. 2A, a specific graph-like visual language flow diagram 200 is depicted. Flow diagram 200 is a Use Case diagram (part of UML) that shows how an actor may use software to place an order. Illustrated in the diagram are different objects and connector types. For example, shape 201 is of the actor type. The other shapes represent things the actor does or things that are done by the process. The lines in between the various shapes are connectors that represent relationships between the shapes. In FIG. 2A, the connectors may be, for example, a <uses> or <extend> type as well as other connector types.

For example, a user (actor) 201 may place an order 208. Placing the order may extend to request a catalog 204 as shown by connector 211. Placing an order uses the actions of supplying customer data 202, ordering the product 203 and arranging payment 205, as illustrated by connectors 212-214. The types of payment may be cash 206 or credit may be arranged 207, as shown by connectors 215 and 216.

Figure 2B:
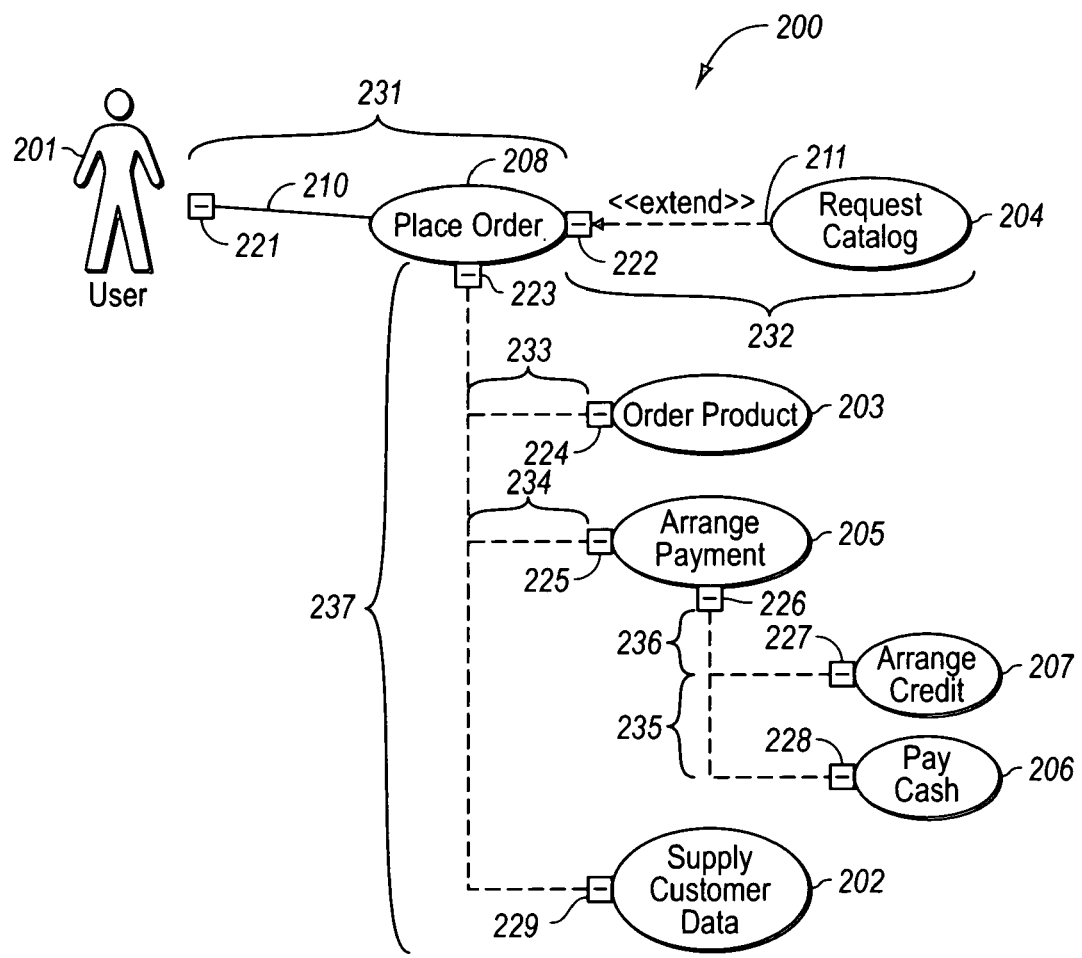
FIG. 2B illustrates the graph-like visual language of FIG. 2A displayed as a graphical two dimensional tree-like structure in accordance with example embodiments.

As mentioned previously, designer tool/application 120 may receive flow diagram 200 and convert the flow diagram 200 into a two dimensional tree-like structure that includes sub-portions 231-237 that can be modified by scaling, collapsing, and expanding in both a vertical and horizontal direction and potentially in a diagonal direction as previously described. Referring now to FIG. 2B, flow diagram 200 is illustrated as it may appear in designer tool/application 120 after having undergone the conversion and display process. Note that diagram 200, which may correspond to tree-like structure 190, although this is not required, still includes objects 201-208, which were previously described. Also note that user interactive (UI) elements 221-229 have also been added to the tree-like structure by designer tool/application 120. The UI elements are used to allow a user to dynamically modify the sub-portions of tree-like structure 200.

In FIG. 2B, connectors 212, 213, and 214 have been converted into a v single connection branch based on their commonality of being <uses> type connectors. In like manner, connectors 215 and 216 have been converted into a single connection branch based on their common connector type. Both of these are an example of a multi-connector, wherein during the conversion to a two dimensional tree-like structure, two or more connections between sub-portions are combined into a connector that is representative of the combined connectors. Of course, it is also possible that connectors of different types could be combined into a single connector if circumstances warrant. For example, in FIG. 2 the vertical line generally corresponding to sub-portion 237 would be the multi-connector while the horizontal lines corresponding to sub-portions 233 and 234 would be specific connectors. In such embodiments, an indication that connectors of different types had been combined into a single connector may be placed next to the horizontal connectors corresponding to sub-portions 233 and 234.

In the diagram, user 201 acts as a root of the tree-like structure. Note that there may be more than one root. For example, "Place Order" 208 may be a root of the two branches branching off of it while "Arrange Payment" 205 may serve as a root of the branch branching off of it as well. The tree-like structure 200 further includes several end portions that serve as the end of a branch. For example, "Request Catalog" 204 may be an end portion as it is the end of a branch. In like manner "Supply Customer Data" 202, "Order Product" 203, "Arrange Payment" 207, and "Pay Cash" 206 may also be considered end portions as they are the end of a branch. In some embodiments, modifications may be made to sub-portions other than end portions. In other embodiments, modifications may be made to all the sub-portions.

As mentioned previously, designer tool/application 120 adds UI elements 221-229 to two dimensional tree-like structure 200. These UI elements allow a user to dynamically modify various sub-portions 231-237 both horizontally and vertically. The modifications are typically one of scaling, collapsing, or expanding the various sub-portions. Several examples will now be described. Note that although the examples typically use collapsing as the illustrated modification, expanding and/or scaling may also be performed even when not explicitly mentioned.

For example, UI 222 can be selected, resulting in the collapsing of sub-portion 232 including object 204 in a vertical direction. Simultaneously, UI 223 can be selected, resulting in a collapsing of sub-portions 233-237 with their corresponding objects. Accordingly, two dimensional tree-like structure 200 has the ability to be modified either horizontally and vertically. Although not illustrated in FIG. 2B, two dimensional tree-like structures may also be modified in a diagonal direction as well, as will be described in relation to FIG. 3 below.

In addition, sub-portions may also be modified in both a horizontal and a vertical direction. For example, UI 226 may be selected, resulting in the collapsing of objects 206 and 207 in the vertical direction. Conversely, UI 227 and/or 228 may be selected, resulting in the horizontal collapsing of objects 206 and/or 207. In like manner, sub-portions 233, 234, and 237 may be vertically modified if UI 223 is selected and may also be horizontally modified if UI 224, 225, and 229 are selected respectively.

In some embodiments, two dimensional tree-like structure 200 also has the ability to make modifications to a sub-portion of the tree-like structure 200 without also automatically making modifications to sub-portions that branch off of the sub-portion being modified. For example, UI 225 may be collapsed. This would collapse sub-portion 234 including object 205. However, sub-portions 235 and 236 would not automatically be collapsed as well. They may simply be rescaled to optimize the available viewing space. Of course, a user may only desire to display object 206, in which case object 207 may also be horizontally collapsed upon receipt of user interaction to this end.

As a further example, sub-portion 231 including object 208 may be collapsed by selecting UI 221. In many conventional one dimensional tree-like structures, this would automatically collapse the rest of the tree-like structure. In a two dimensional tree, the other sub-portions are still displayed until user interaction specifies modifications to them, although in some embodiments they may be automatically scaled to allow for optimization of the display. Accordingly, a user may dynamically modify tree-like structure 200 so as to display only the sub-portions that are desirable to the user.

Note that in FIG. 2B and FIGS. 3 and 4 to follow, only one UI element is illustrated for each object or sub-portion. The illustrated UI elements allow for collapsing and expanding of the sub-portions. It is to be appreciated that a greater number of UI elements may also be employed. Such additional UI elements may be used for expanding and collapsing of property flags, user comments, additional relationships between objects and/or sub-portions and the like. Accordingly, two dimensional tree-like structures that implement any number of UI elements are contemplated by the embodiments disclosed herein.

Figure 3A:
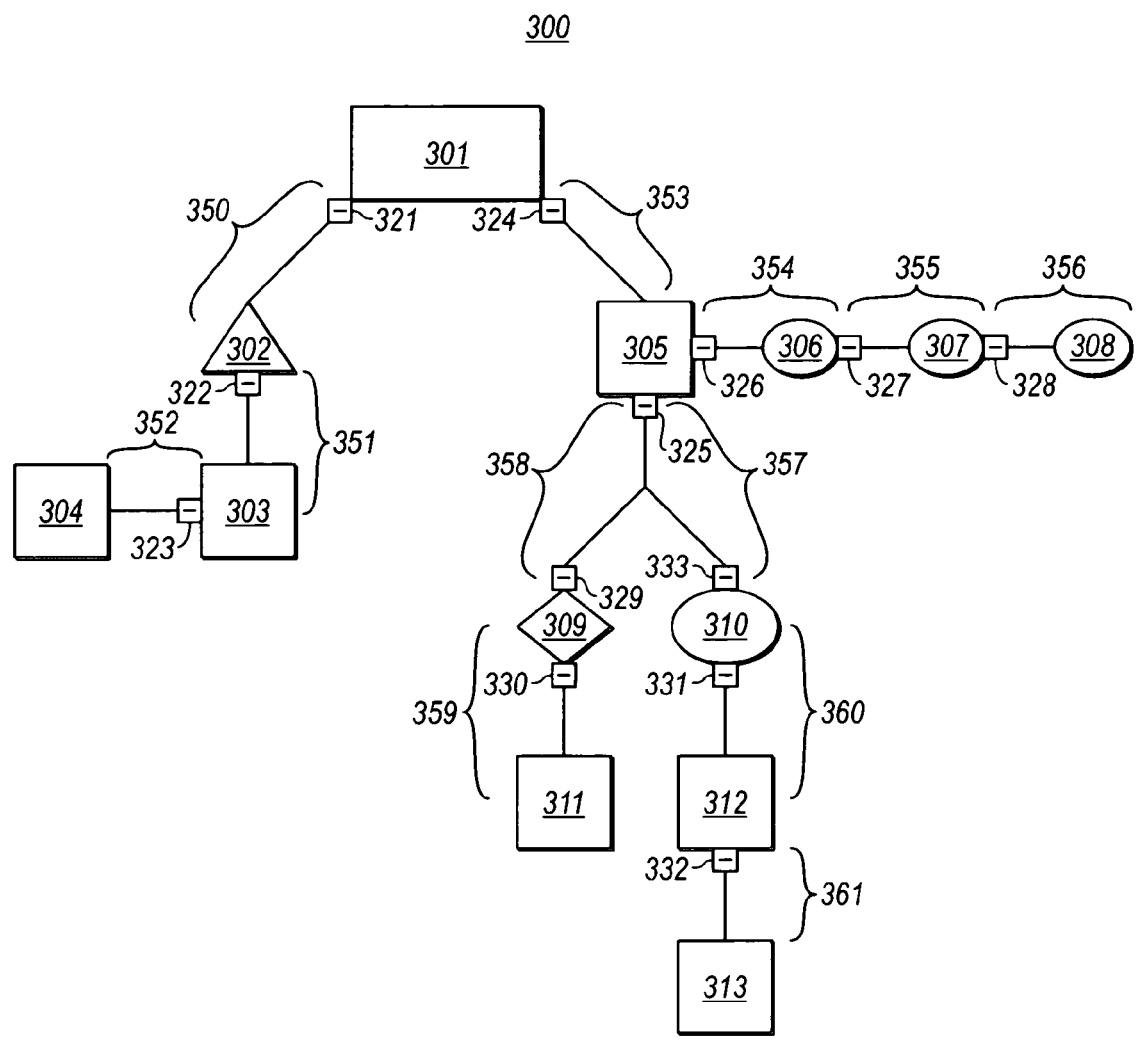
FIG. 3A illustrates an example graphical two dimensional tree-like structure in accordance with example embodiments.

To further illustrate the dynamic modification abilities provided by design tool/application 120, a generalized two dimensional tree-like structure 300, which may correspond to tree-like structure 190 of FIG. 1, is depicted in FIG. 3A. FIG. 3A includes various shapes 301-313. Note that these shapes include or describe various objects, attributes, operations, associations, or the like. The exact nature of shapes 301-313 is not important to the embodiments described herein, and are illustrated as various shapes to reflect this. Tree-like structure 300 further includes UI elements 321-333 that are placed in the tree-like structure to allow dynamic modification of the sub-portions of the tree-like structure through expansion/collapsing and scaling mechanisms. Note that overall layout of tree-like structure 300 is for illustration only and should not be used to limit the embodiments disclosed herein.

Shape 301 may act as root of the tree-like structure, although other elements may also be roots of the tree-like structure as well. Branching out from the root are various sub-portions 350-361. Note that some of the sub-portions are oriented in a horizontal direction, some in a vertical direction, and some in a diagonal direction. Since tree-like structure 300 is two dimensional, it may be modified in any of these directions as circumstances warrant. As mentioned previously, the modifications are typically scaling, collapsing, or expanding.

Figure 3B:
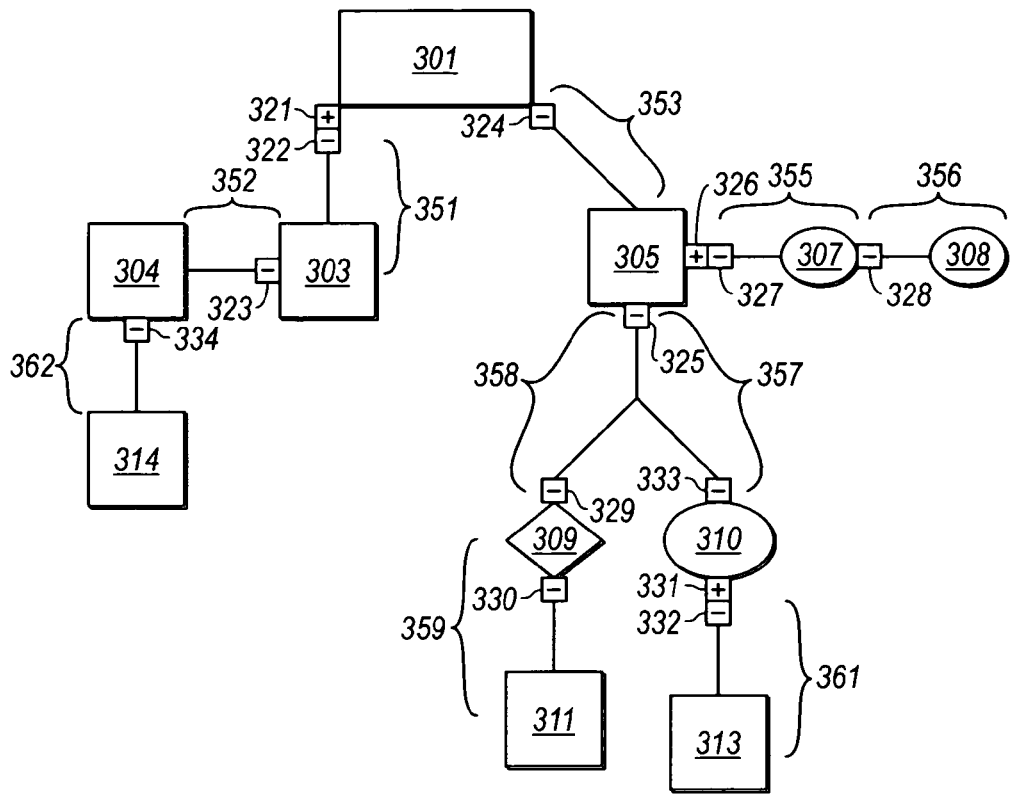
FIG. 3B illustrates modifications made to the graphical two dimensional tree-like structure of FIG. 3A.

Referring to FIG. 3B, tree-like structure 300 is depicted after some of the sub-branches have been modified. For example, a user may desire to modify diagonal sub-portion 350. The user can provide input that would select UI element 321, thus collapsing sub-portion 350 including shape 302 in the diagonal direction. In some embodiments, sub-portions 351 and 352 may also be diagonally collapsed when UI 321 is selected. In other embodiments, two dimensional tree-like structure 300 only collapses diagonal sub-portion 350 while still displaying sub-portions 351 and 352. In a one dimensional tree-like structure, sub-portions 351 and 352 would typically always be collapsed. At a later time, UI 321 may be selected to dynamically expand diagonal sub-portion 350 should this be desirable.

In like manner, the user may also desire to modify vertical sub-portion 360. The user would provide input that selects UI element 331, thus collapsing sub-portion 360 including shape 312 in a vertical direction. In a one dimensional tree-like structure, sub-portion 360 would typically always also be collapsed. However, in some embodiments, two dimensional tree-like structure 300 only collapses vertical sub-portion 360 while still displaying sub-portion 361. At a later time, UI 331 may be selected to dynamically expand vertical sub-portion 360 should this be desirable.

Similarly, the user may also desire to modify horizontal sub-portion 354. The user would provide input that selects UI element 326, thus collapsing sub-portion 354 including shape 306 in the horizontal direction. As previously described, in a one dimensional tree-like structure, sub-portions 355 and 356 would also typically be collapsed. In some embodiments, two dimensional tree-like structure 300 only collapses horizontal sub-portion 306 while still displaying sub-portions 307 and 308. As with the diagonal and vertical modifications, at a later time, UI 326 may be selected to dynamically expand horizontal sub-portion 354 should this be desirable.

In addition, FIG. 3B also illustrates that a new sub-portion 362 including shape 314 and UI element 334 has been added to two dimensional tree-like structure 300. Designer tool/application 120 allows a user to select a portion of tree-like structure 300 where it would be desirable to add the new sub-portion. For example, a user may use a user interface that allows the user to select and drag a new graphical sub-portion or object and place it on tree-like structure in a desirable location. Designer tool/application 120 may then automatically add the new sub-portion or object; with tree-like structure 300 being scaled optimize the available display space. Accordingly, the user may dynamically add new sub-portions or objects to tree-like structure 300.

Figure 3C:
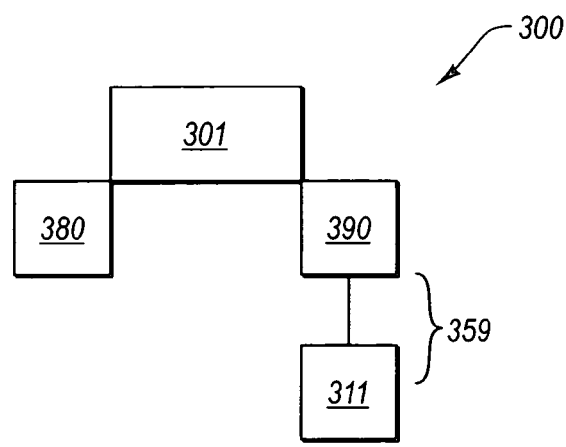
FIG. 3C illustrates further modifications to the graphical two dimensional tree-like structure of FIG. 3A.

Referring to FIG. 3C, further modifications are shown to two dimensional tree-like structure 300. In this depiction, root shape 301 and an end portion 359 including shape 311 are shown. Also shown is box 380 that represents sub-portion 350 and all of the sub-portions beyond sub-portion 350 of FIG. 3A. Similarly, box 390 represents sub-portion 353 and all of the sub-portions beyond sub-portion 353 of FIG. 3A. Note that boxes 380 and 390 are used for ease of convenience only, and are not meant to imply any actual display by designer tool 120.

FIG. 3C illustrates the ability of the two dimensional tree-like structure 300 to have modified any sub-portion without also having to also modify sub-portions that branch off of a portion being modified. Although only three example modifications were illustrated in tree-like structure 300, any of the other sub-portions shown in FIG. 3A may also be scaled, collapsed, or expanded horizontally, vertically and/or diagonally as desired. A user thus has the ability to dynamically expand portions of boxes 380 and 390 to display those portions that are deemed desirable by the user. This advantageously allows the user to focus in on the sub-portions of greatest interest.

In addition, FIG. 3C illustrates that tree-like structure 300 has the ability to collapse all elements except the root shape and an end portion if this is so desired. This may be advantageous for a tree-like structure with hundreds of sub-portions where it is desirable to display only the beginning and end of a process, for example. Note that designer tool 120 also dynamically scales tree-like structure 300 to optimally fit the available display space when the modifications are made in FIGS. 3B and 3C, although this is not illustrated.

It has been mentioned several times above that some embodiments disclosed herein relate to a two dimensional tree-like that has sub-portions that may be modified without having to also modify an end portion or a sub-portion that branched off of a sub-portion being modified. This is different from how one dimensional tree-like structures are typically modified. Such one dimensional tree-like structures are generally displayed as having a root and one or more branches that include various sub-portions that branch off the main branch and/or other sub-portions. Examples of one dimensional tree-like structures include well known file and folder directories of computer operating systems. The one dimensional tree-like structure allows a user to collapse and expand the various sub-portions. However, in sharp contrast to some embodiments of two dimensional tree-like structures described above, a sub-portion that acts as an end portion is typically also modified any time any another sub-portion above it is modified.

Figure 5:
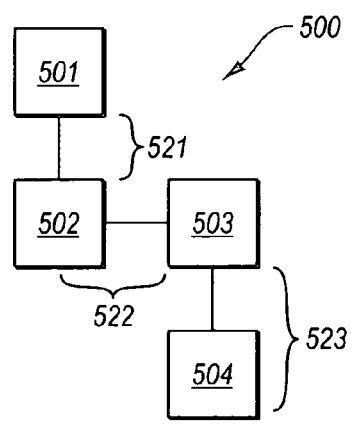
FIG. 5 illustrates a graphical one dimensional tree-like structure.

For example, FIG. 5 illustrates a typical one dimensional tree-like structure 500. Tree like structure 500 includes shapes 501-504, which may be any graphical object. A second sub-portion 522 branches off of a first sub-portion 521 and a third sub-portion 523, which also acts as the end portion in this tree-like structure, branches off of the second sub-portion 522. If a user collapsed the first sub-portion 521, then the second and third sub-portions 522 and 523 including shapes 502, 503 and 504, would also automatically collapse. In like manner, collapsing the second sub-portion 522 would automatically collapse the third sub-portion 523 including shapes 503 and 504. A user simply is not able to collapse the second sub-portion 522 while still displaying the third sub-portion 523 or collapse the first sub-portion 521 while still displaying the second and/or third sub-portions 522 and 523. In like manner, expanding sub-portions 521 and/or 522 also automatically expands sub-portion 523. In all the above scenarios, any modification to a sub-portion above the end portion 523 results in end portion 523 also being modified.

Figure 4A:
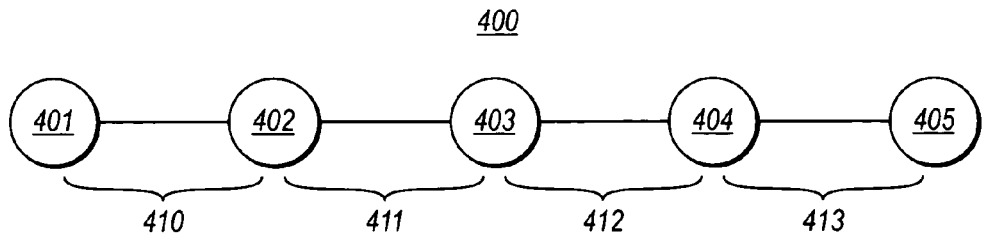
FIG. 4A illustrates another example graphical two dimensional tree-like structure in accordance with example embodiments.
Figure 4B:
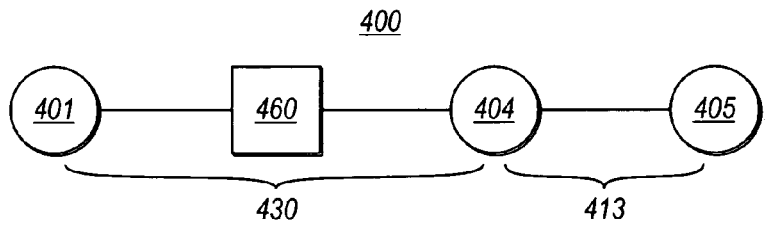
FIG. 4B illustrates modifications made to the graphical two dimensional tree-like structure of FIG. 4A.
Figure 4C:
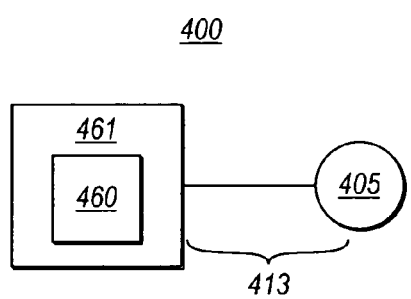
FIG. 4C illustrates further modifications to the graphical two dimensional tree-like structure of FIG. 4A.

Referring now to FIGS. 4A-4C, a further example of additional modification aspects of some embodiments of a two dimensional tree-like structure are illustrated. In FIG. 4A, a two dimensional tree-like structure 400, which may correspond to tree-like structure 190 of FIG. 1, is illustrated with shapes 401-405. As with the previous example, the exact nature of shapes 401-405 is unimportant. In this example, shape 401 represents the root of tree-like structure 400, which also includes sub-portions 410-413. As described above, user input may be received that modifies sub-portion 411.

Referring to FIG. 4B, the modification of sub-portion 411 results in a UI element 460, which represents shapes 402 and 403 that have been collapsed. Tree-like structure 400 now includes shapes 401, 404, and 405. In addition, a sub-portion 430 is then created that includes sub-portions 410, 412 and UI element 460.

Referring now to FIG. 4C, it is shown that a user has modified sub-portion 430, which is results in a UI element 461 that represents shapes 401 and 404 that have been collapsed as well as UI element 460 representing the previously collapsed shapes. Note that although UI element 460 is shown in FIG. 4C inside UI element 461, this may not be a necessary feature. For example, in some embodiments, a single UI element may, when selected by a user, cause all the collapsed sub-portions of UI elements 460 and 461 to expand. In other embodiments, UI element 460 may be hidden in UI element 461 and may not be visible until UI element 461 is expanded.

In another embodiment, FIG. 4C shows that designer tool 120 is able to remember the states of hidden sub-portions. For example, if UI element 461 were later expanded by a user, then shapes 401 and 404 would be displayed, but shapes 402 and 403 would still be collapsed and represented by UI element 460 until UI element 460 was later expanded.

In other embodiments, as was mentioned previously, computing system 100 includes a persistent memory 170 that may be used to maintain the modifications made to a two dimensional tree-like structure. For example, referring back to FIGS. 4A-4C, when sub-portion 411 is collapsed into UI element 460, this modification may be maintained in the persistent memory. If a user were to exit designer tool/application 120, the modification would not be lost. At a later time, when the user reactivates designer tool/application 120, tree-like diagram 400 will be displayed as shown in FIG. 4B.

Similarly, if the user collapses sub-portion 430 into UI element 461 prior to exiting designer tool/application 120, then both the modifications made to sub-portion 430 and the modifications made to sub-portion 411, which may be hidden, are maintained in persistent memory 170. At a later time, when the user reactivates designer tool/application 120, tree-like diagram 400 will be displayed as shown in FIG. 4C. Advantageously the modification represented by UI element 460, whether hidden or not, is also retained such that if the user expands UI element 461 then UI element 460 will be displayed as in FIG. 4B. If UI element 460 is then expanded, tree-like structure 400 will be displayed as shown in FIG. 4A. Accordingly, the ability to persist hidden and non-hidden modifications even when exiting the application running the tree-like structure allows a user the ability to modify without having to keep track of all the modifications made upon exiting the application. This is especially useful for tree-like structures that include hundreds of nested sub-portions. If the modification were not persisted, then a user would have to redo the modifications every time the application was started.

The present invention may also be described in terms of methods comprising functional steps and/or non-functional acts. The following is a description of steps and/or acts that may be performed in practicing the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use of steps and/or acts in the recitation of the claims—and in the following description of the flow diagrams for FIGS. 6-9—is used to indicate the desired specific use of such terms.

As previously mentioned, FIGS. 6-9 illustrate flow diagrams for various exemplary embodiments of the present invention. The following description of FIGS. 6-9 will occasionally refer to corresponding elements from FIGS. 1-4. Although reference may be made to a specific element from these Figures, such references are used for illustrative purposes only and are not meant to limit or otherwise narrow the scope of the described embodiments unless explicitly claimed.

Figure 6:
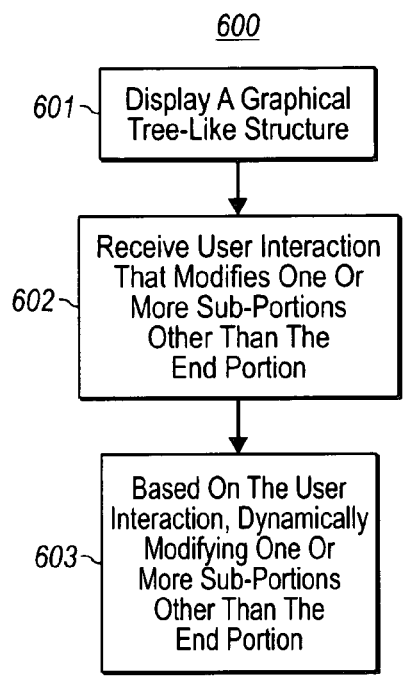
FIG. 6 illustrates a flow chart of a method for dynamically laying out a flow diagram of graph-like visual languages into a graphical two dimensional tree-like structure in accordance with example embodiments.

Turning first to FIG. 6, a flow diagram of a method 600 for dynamically laying out a flow diagram of graph-like visual languages into a two dimensional tree-like structures that allow for ease of user interaction with and optimal display is illustrated. Method 600 includes displaying 601 a graphical tree-like structure that includes at least one branch starting at a root of the tree-like structure and including a plurality of sub-portions, wherein the sub-portions include at least one end portion. The sub-portions model a system, service, or process in terms of functional relationships and internal behaviors of for one or more objects, attributes, operations, or associations.

For example, layout/presentation module 130 of designer tool/application 120 may display two dimensional tree-like structure 190. Tree-like structures 200, 300, and 400 are examples of two-dimensional tree-like structures meeting the definition above.

Method 600 also includes receiving 602 user interaction that modifies one or more sub-portions of the graphical tree-like structure other than the at least one end portion. For example, modify module 140 of designer tool/application 120 may receive user input 180 that modifies a sub-portion of tree-like structure 190. In some embodiments, the user interaction may select one or more sub-portions for scaling, collapsing, or expanding. This may be done by activating a UI element associated with the sub-portion that will be modified.

In some embodiments, modify module 140 of designer tool/application 120 also receives one or more predefined rules 160 that specify how the tree-like-structure 190 is to be modified and displayed. Based on the rules and the received user interaction, the tree-like structure 190 is dynamically modified.

Method 600 further includes, based on the user interaction, dynamically modifying 603 by one of scaling, expanding, or collapsing the one or more sub-portions other than the end portion to allow for ease of user interaction, optimization of display, or both without modifying the end portion. For example, modify module 140 of designer tool/application 120 may dynamically modify tree-like structure 190, which may then be optimized for display by layout module 130. The sub-portions may be modified vertically, horizontally, diagonally, or any combination thereof.

For example, in some embodiments one or more sub-portions may be collapsed vertically, horizontally, diagonally, or any combination thereof without collapsing an end portion as is illustrated in FIG. 3B. In such embodiments, collapsing may include automatically formatting at least one of the sub-portions into a single graphical object such as a UI element described above. The single graphical object will generally be configured to be expandable back into the at least one sub-portion upon receipt of additional user interaction. The additional user interaction may be as simple as the user expanding the UI element.

In further embodiments, a second sub-portion that has at least one node coupled to a first sub-portion may be dynamically scaled, collapsed or expanded. The first sub-portion may then be dynamically modified subsequent to the second sub-portion without modifying the end portion. This allows for hidden modifications in the tree-like data structure as is illustrated in FIGS. 4A-4C.

In other embodiments, one or more of the sub-portions may also expanded vertically, horizontally, diagonally, or any combination thereof without expanding an end portion. In such embodiments, expanding may include automatically formatting an expandable graphical object such as a UI element into at least one sub-portion.

In still other embodiments, the dynamic modification may include adding a new sub-portion to the tree-like structure. For example, sub-portion 362 including shape 314 is added to two dimensional tree-like structure 300. The new sub-portion may be added by selecting the desired location in the tree-like structure and having designer tool/application 120 automatically position the new sub-portion while also automatically balancing the tree-like structure.

Figure 7:
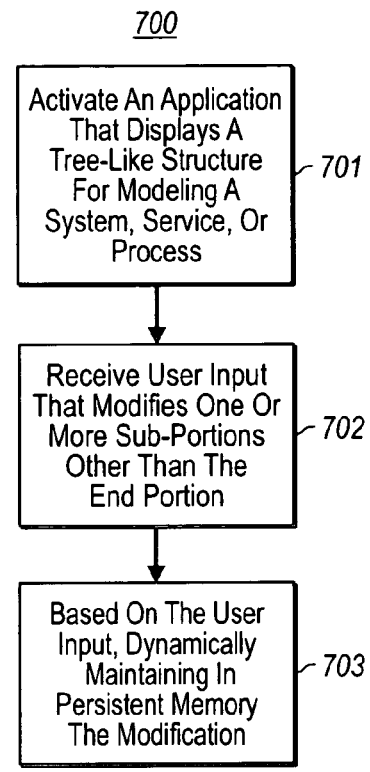
FIG. 7 illustrates a flow chart of a method for persistently retaining in memory modifications to one or more sub-branches of a graphical tree-like in accordance with example embodiments.

Turning now to FIG. 7, a flow diagram of a method 700 for persistently retaining in memory modifications to one or more sub-branches of a visual tree-like structure such that changes made to the display of the tree-like structure are maintained even when an application used to modify the tree-like structure is exited by a user is illustrated. Method 700 includes activating 701 an application that display a tree-like structure including at least one branch starting at a root of the tree-like a structure and including a plurality of sub-branches. The sub-branches are for modeling a system, service, or process in terms of functional relationships and internal behaviors for one or more objects, attributes, operations, and associations.

For example, designer tool/application 120 may be activated to display a tree-like structure 190, examples of which are shown in FIGS. 2-4. In some embodiments, the tree-like structure may also be a one dimensional tree-like structure.

Method 700 also includes receiving 702 user input that modifies at least one of the plurality of sub-branches. For example, modify module 140 receives user input 140 that modifies one or more sub-branches of tree-like structure 190. In some embodiments, the user input may select a UI element that expands or collapses the sub-branch. The modification may include scaling, collapsing, and expanding the sub-branch being modified.

Method 700 further includes, based upon the user input, maintaining 703 in persistent memory the modification made to the sub-branch such that, upon reactivation at a later time after user has exited the application, the tree-like structure can be displayed exactly as it appeared when the application was exited. For example, modifications made to tree-like structure 190 may be maintained in persistent memory 170. When designer tool/application 120 is exited and then later reactivated, the display of tree-like structure 190 when designer tool/application 120 was exited is once again displayed.

In some embodiments, user input is received to modify a second sub-branch that has a node coupled to a first sub-branch. The second sub-branch is modified. Subsequent to this modification, the first sub-branch is modified such that the modification of the second sub-branch is hidden. The hidden modified state of the second sub-branch may then be preserved in the persistent memory. When the application is run at a later time, receipt of user input such as selecting a UI element allow the hidden second sub-branch to be displayed.

For example, referring to FIGS. 4A-4C, sub-portion 411 may be collapsed into UI element 411. Subsequent to this, sub-portion 430 may be collapsed into a UI element 461 that hides UI element 411 as explained above. Preserving tree-like structure 400 including UI element 461 in persistent memory 170 allows, when application 120 is reactivated, the recovery of sub-portion 411 as described previously.

Figure 8:
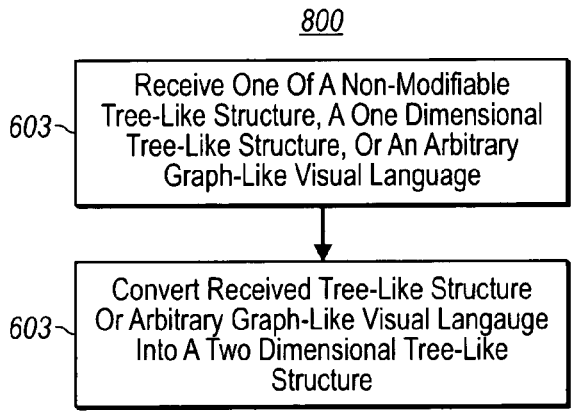
FIG. 8 illustrates a flow chart of a method for converting a graphical tree-like structure into a graphical two dimensional tree-like structure in accordance with example embodiments.

Referring to FIG. 8, a method 800 for converting a visual tree-like structure into a two dimensional tree-like structure is illustrated. Method 800 includes receiving 801 a first tree-like structure or graph-like visual language including a plurality of sub-portions that cannot be modified. In the alternative, a second tree-like structure that includes at least one branch starting at a root of the tree-like structure and including a plurality of sub-portions. The sub-portions model a system, service, or process in terms of functional relationships and internal behaviors of for one or more objects, attributes, operations, or associations. The sub-portions include at least one end portion that is modified whenever one or more sub-portions are modified.

For example, layout module 130 of designer tool/application 120 may receive graph-like visual language 110 which may be a preexisting tree-like structure that cannot be modified, a preexisting one dimensional tree-like structure that can only be modified if an end portion is modified, or a preexisting arbitrary graph-like visual language. Graph-like visual language 110 may also be any of these three that were created by the user as described above. The arbitrary graph-like visual language may include one of structure diagrams that emphasize what things must be in the system, service, or process being modeled, behavior diagrams that emphasize what must happen in the system, service, or process being modeled, and interaction diagrams that emphasize the flow of control and data among the things in the system, service, or process being modeled. It may also include the various diagram types of the Unified Modeling Language (UML), entity relationship diagrams in the database world, and business process diagrams for business process design.

Method 800 also includes converting 802 the received first or second tree-like structure or arbitrary graph-like visual language into a two dimensional tree-like structure. The two dimensional tree-like structure includes at least one branch starting at a root of the two dimensional tree-like structure and including a plurality of sub-portions that include an end portion, wherein the sub-portions other than the end portion can be modified by scaling, collapsing, or expanding without also modifying the end portion.

For example, convert module 150 may convert the received tree-like structure or graph-like visual language into a two dimensional tree-like structure 190. The two dimensional tree-like structure may be modified vertically, horizontally, diagonally, or any combination of the three as previously described. The converted two dimensional tree-like structure also allows for all of the functionality previously described for a two dimensional tree-like structure in relation to the other methods and embodiments described herein.

Figure 9:
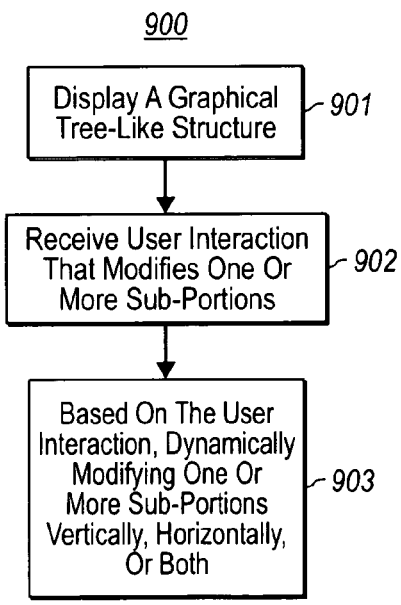
FIG. 9 illustrates a flow chart of a method for dynamically laying out a flow diagram of graph-like visual languages into a graphical two dimensional tree-like structure in accordance with example embodiments.

Referring now to FIG. 9, a flow diagram of a method 900 for dynamically laying out a diagram of a graph-like visual language into a two dimensional tree-like structure that allow for ease of user interaction with and optimal display is illustrated. Method 900 includes displaying 901 a graphical tree-like structure that includes at least one branch starting at a root of the tree-like structure and including a plurality of sub-portions that are configured to be modified in a vertical direction and a horizontal direction. The sub-portions model a system, service, or process in terms of functional relationships and internal behaviors of for one or more objects, attributes, operations, or associations. The sub-portions may also be configured to be modified diagonally as well.

For example, layout/presentation module 130 of designer tool/application 120 may display two dimensional tree-like structure 190. Tree-like structures 200, 300, and 400 are examples of two-dimensional tree-like structures meeting the definition above.

Method 900 also includes receiving 902 user interaction that modifies one or more sub-portions of the graphical tree-like structure other than the at least one end portion. For example, modify module 140 of designer tool/application 120 may receive user input 180 that modifies a sub-portion of tree-like structure 190. In some embodiments, the user interaction may select one or more sub-portions for scaling, collapsing, or expanding vertically, horizontally and potentially diagonally. This may be done by activating a UI element associated with the sub-portion that will be modified.

Method 900 further includes, based on the user interaction, dynamically modifying 903 horizontally, vertically, or both to allow for ease of user interaction, and optimization of display, or both. For example, modify module 140 of designer tool/application 120 may dynamically modify tree-like structure 190, which may then be optimized for display by layout module 130. The sub-portions may be scaled, expanded, or collapsed.

In further embodiments, a second sub-portion that has at least one node coupled to a first sub-portion may be dynamically modified. The first sub-portion may then be dynamically modified subsequent to the second sub-portion in a way that hides the modification to the second sub-portion. This allows for hidden modifications in the tree-like data structure as is illustrated in FIGS. 4A-4C. The hidden modification may later be displayed upon the receipt of additional user input.

In still other embodiments, the dynamic modification may include adding a new sub-portion to the tree-like structure. For example, sub-portion 362 including shape 314 is added to two dimensional tree-like structure 300. The new sub-portion may be added by selecting the desired location in the tree-like structure and having designer tool/application 120 automatically position the new sub-portion while also automatically balancing the tree-like structure. Other modification techniques such as combining multiple connectors into one connector may also be implemented.

In additional embodiments, optimization of the display of the graphical tree-like structure includes automatically switching one or more sub-portions from a horizontal orientation to a vertical orientation or switching one or more sub-portions from a vertical orientation to a horizontal orientation to optimize for the aspect ratio of a display device or window. For example, in some circumstances, one or more branches of the graphical tree-like structure may make the display of the graphical tree-like structure non-optimized for the aspect ratio of a display device. The graphical tree-like structure may be to long vertically, for example, while the display device or window has unused display space horizontally. In such a case, designer tool/application 120 may automatically switch one or more vertical sub-portions to be displayed horizontally. These sub-portions may be switched back to be displayed vertically at a later time is circumstances warrant such as when a new element is added to the graphical tree-like structure that requires the switching to keep the display optimized.

For instance, referring to FIG. 3A, in some embodiments, designer tool/application 120 may automatically switch the display of vertical sub-portions 360 and 361 so as to display them as branching horizontally from element 310 to optimize for the aspect ratio of the display device. In like manner, designer tool/application 120 may automatically switch the display of horizontal sub-portions 354-356 (or any subset of these sub-portions) so as to display them as branching vertically from element 305 if circumstances warrant. Note that designer tool/application 120 may automatically switch the display orientation of any of the elements of FIGS. 3A and 3B as necessary to optimize for the aspect ratio of the display device or window.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. Within a computing system that uses a graph-like visual language to model graphical diagrams for such things as a system, service, or process or that represent an overall object system, that typically require manual modification and rescaling, a method for dynamically laying out the diagrams into a two dimensional tree-like structure to allow ease of user interaction with and optimal display thereof, the method comprising:

displaying a graphical tree-like structure that includes at least one branch starting at a root of the graphical tree-like structure and including two or more sub-portions for representing an overall object model in terms of functional relationships and internal behaviors for two or more objects, attributes, operations, associations, wherein the two or more sub-portions are configured to be modified in a vertical direction and a horizontal direction, wherein each sub-portion includes a user interactive element and a shape that are connected with a line, each sub-portion being connected to another sub-portion such that the user interactive element of one sub-portion is displayed adjacent to the shape of another sub-portion, each user interactive element being selectable to expand or collapse the corresponding sub-portion;

receiving user interaction that selects the user interactive element of a first sub-portion of the one or more sub-portions of the graphical tree-like structure, wherein the first sub-portion is expanded prior to the selection, the first sub-portion being connected to a second sub-portion; and based on the user interaction, dynamically collapsing the first sub-portion to allow for ease of user interaction, optimization of the display of the graphical tree-like structure, or both, by displaying only the first user interactive element in place of the first sub-portion such that the first user interactive element is displayed adjacent to and connected to a second user interactive element corresponding to the second sub-portion.

2. The method in accordance with claim 1, further comprising:

dynamically collapsing the second sub-portion; and dynamically expanding the first sub-portion subsequent to collapsing the second sub-portion such that the second sub-portion is hidden when the first sub-branch is expanded and wherein the second sub-portion can be displayed upon receipt of additional user interaction.

3. The method in accordance with claim 1, wherein a new sub-portion is added to the graphical tree-like structure by positioning the new sub-portion in a desired location of the graphical tree-like structure and wherein the new sub-portion is automatically added to the graphical tree-like structure.

4. The method in accordance with claim 1, wherein the graph-like visual language includes one or more of structure diagrams that emphasize what things are in the system, service, or process being modeled, behavior diagrams that emphasize what happens in the system, service, or process being modeled, and interaction diagrams that emphasize the flow of control and data among the things in the system, service, or process being modeled.

5. The method in accordance with claim 1, wherein optimization of the display of the graphical tree-like structure includes automatically switching one or more sub-portions from a horizontal orientation to a vertical orientation or switching one or more sub-portions from a vertical orientation to a horizontal orientation to optimize for the aspect ratio of a display device or window.

6. A computer program product comprising computer executable instructions that when executed are capable of implementing the method of claim 1.

7. The method in accordance with claim 1, wherein a plurality of sub-portions that are each connected to the same sub-portion or the root are merged into a multi-connector sub-portion wherein a multi-connector sub-portion comprises:

a common user interactive element which is displayed adjacent to the same sub-portion or the root to which each of the plurality of sub-portions is connected, wherein the common user interactive element is selectable to expand or collapse the entire multi-connector sub-portion;

a multi-connector line which extends from the common user interactive element; and a specific user interactive element for each of the plurality of sub-portions that is displayed adjacent to the shape of the corresponding sub-portion and that is connected to the multi-connector line by a specific line, wherein each specific user interactive element is selectable to expand or collapse the corresponding sub-portion.

8. Within a computing system that uses a graph-like visual language to model graphical diagrams for such things as a system, service, or process or that represent an overall object system, that typically require manual modification and rescaling, a method for dynamically laying out the diagrams into a two dimensional tree-like structure to allow ease of user interaction with and optimal display thereof, the method comprising:

displaying a graphical tree-like structure that includes at least one branch starting at a root of the graphical tree-like structure and including two or more sub-portions for representing an overall object model in terms of functional relationships and internal behaviors for two or more objects, attributes, operations, associations wherein each sub-portion includes a user interactive element and a shape that are connected with a line, each sub-portion being connected to another sub-portion such that the user interactive element of one sub-portion is displayed adjacent to the shape of another sub-portion, each user interactive element being selectable to expand or collapse the corresponding sub-portion;

receiving user interaction that selects the user interactive element of a first sub-portion of the one or more sub-portions of the graphical tree-like structure other than the at least one end portion, wherein the first sub-portion is expanded prior to the selection, the first sub-portion being connected to a second sub-portion; and based on the user interaction, dynamically collapsing the first sub-portion to allow for ease of user interaction, optimization of the display of the graphical tree-like structure, or both without also modifying the end portion, by displaying only the first user interactive element in place of the first sub-portion such that the first user interactive element is displayed adjacent to and connected to a second user interactive element corresponding to the second sub-portion.

9. The method in accordance with claim 8 wherein the second sub-portion is an end portion.

10. The method in accordance with claim 8, further comprising:

receiving one or more predefined rules that specify how the tree-like structure is to be modified and displayed; and based on the one or more rules and the received user interaction, dynamically collapsing the first sub-portion.

11. The method in accordance with claim 8, further comprising automatically converting one of a one dimensional graphical tree-like structure or a non-modifiable graphical tree-like structure into a two dimensional graphical tree-like structure.

12. The method in accordance with claim 8, further comprising:

receiving user interaction that selects the user interactive element of the first sub-portion while the first sub-portion is collapsed; and expanding the first sub-portion.

13. A computer program product comprising computer executable instructions that when executed are capable of implementing the method of claim 8.

14. Within a computing system including a graph-like visual language for modeling a diagram of such things as a system, service, or process or that represent an overall object system displayed as a visual tree-like structure, a method for persistently retaining in memory modifications to one or more sub-branches of the visual tree-like structure such that changes made by a user to the display of the visual tree-like structure are maintained even when an application used to modify the visual tree-like structure is exited by a user, the method comprising:

activating an application that displays a graphical tree-like structure that includes at least one branch starting at a root of the graphical tree-like structure and including a plurality of sub-branches representing an overall object model in terms of functional relationships and internal behaviors for one or more objects, attributes, operations, associations, wherein each sub-branch includes a user interactive element and a shape that are connected with a line, each sub-branch being connected to another sub-branch such that the user interactive element of one sub-branch is displayed adjacent to the shape of another sub-branch, each user interactive element being selectable to expand or collapse the corresponding sub-branch;

receiving user input that selects the user interactive element of a first sub-branch of the plurality of sub-branches, the first sub-branch being connected to a second sub-branch;

based on the user input, dynamically collapsing the first sub-branch to allow for ease of user interaction, optimization of the display of the graphical tree-like structure, or both, by displaying only the first user interactive element in place of the first sub-branch such that the first user interactive element is displayed adjacent to and connected to a second user interactive element corresponding to the second sub-branch;

receiving second user input; and based on the second user input, maintaining in persistent memory the first sub-branch in the collapsed state such that, upon reactivation at a later time after a user has exited the application, the graphical tree-like structure is displayed as it appeared before the application was exited.

15. The method in accordance with claim 14, further comprising:

receiving user input to collapse the second sub-branch;

collapsing the second sub-branch prior to expanding the first sub-branch such that the first sub-branch is hidden when the second sub-branch is collapsed; and preserving in the persistent memory the hidden collapsed state of the second sub-branch upon exiting the application such that upon running the application at a later time the second sub-branch can be expanded upon receipt of additional user interaction.

16. A computer program product comprising computer executable instructions that when executed are capable of implementing the method of claim 14.

\* \* \* \* \*

UNITED STATES PATENT AND TRADEMARK OFFICE
CERTIFICATE OF CORRECTION

| | | |
|---|---|---|
| PATENT NO. | : 7,661,076 B2 | Page 1 of 1 |
| APPLICATION NO. | : 11/395624 | |
| DATED | : February 9, 2010 | |
| INVENTOR(S) | : Jochen Seemann | |

It is certified that error appears in the above-identified patent and that said Letters Patent is hereby corrected as shown below:

In column 18, line 62, in Claim 8, delete "associations" and insert -- associations, --, therefor.

Signed and Sealed this
Tenth Day of May, 2011

David J. Kappos
*Director of the United States Patent and Trademark Office*